United States Patent
Lee et al.

(10) Patent No.: US 7,944,519 B2
(45) Date of Patent: May 17, 2011

(54) LIQUID CRYSTAL DISPLAY MODULE

(75) Inventors: Jae-Ho Lee, Gumi-si (KR); Seok-Hwan Oh, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 234 days.

(21) Appl. No.: 12/314,693

(22) Filed: Dec. 15, 2008

(65) Prior Publication Data

US 2010/0007813 A1    Jan. 14, 2010

(30) Foreign Application Priority Data

Jul. 8, 2008    (KR) .................. 10-2008-0066135

(51) Int. Cl.
*G02F 1/1333*    (2006.01)
*G09F 13/04*    (2006.01)
*F21V 7/04*    (2006.01)

(52) U.S. Cl. .................. 349/58; 362/97.1; 362/632

(58) Field of Classification Search ............ 349/58–60, 349/65, 64; 362/97.1, 97.2, 97.4, 632–634
See application file for complete search history.

(56) References Cited

U.S. PATENT DOCUMENTS

| | | | | |
|---|---|---|---|---|
| 6,905,224 B2 * | 6/2005 | Yoo et al. | | 362/225 |
| 7,431,468 B2 * | 10/2008 | Kang et al. | | 362/97.1 |
| 7,564,516 B2 * | 7/2009 | Azuma et al. | | 349/61 |
| 7,607,791 B2 * | 10/2009 | Yoo et al. | | 362/97.2 |
| 7,714,955 B2 * | 5/2010 | Tsubokura et al. | | 349/61 |
| 7,759,853 B2 * | 7/2010 | Park et al. | | 313/492 |
| 7,804,556 B2 * | 9/2010 | Lee | | 349/65 |
| 2006/0103775 A1 * | 5/2006 | Chung | | 349/58 |
| 2008/0055510 A1 * | 3/2008 | Park | | 349/58 |
| 2008/0225198 A1 * | 9/2008 | Azuma et al. | | 349/58 |
| 2008/0278660 A1 * | 11/2008 | Lee | | 349/65 |
| 2009/0244435 A1 * | 10/2009 | Tsubokura et al. | | 349/58 |
| 2010/0026924 A1 * | 2/2010 | Yang et al. | | 349/58 |

* cited by examiner

*Primary Examiner* — Michelle R Connelly Cushwa
(74) *Attorney, Agent, or Firm* — McKenna Long & Aldridge LLP

(57) ABSTRACT

A liquid crystal display (LCD) module includes a bottom case; a reflector on the bottom case; a plurality of lamps on the reflector; a driving voltage supply portion supplying driving voltages to the lamps and coupled with the bottom case using a screw; a side supporter crossing and covering one end portions of the lamps and including a protrusion facing a head of the screw, wherein a distance between the protrusion and the screw is less than a height of the screw; a plurality of optical sheets on the side supporter; a liquid crystal panel on the optical sheets; a main supporter surrounding the optical sheets and the liquid crystal panel; and a top case covering a peripheral region of the liquid crystal panel.

12 Claims, 7 Drawing Sheets

LIQUID CRYSTAL DISPLAY MODULE

The present invention claims the benefit of Korean Patent Application No. 2008-0066135, filed in Korea on Jul. 8, 2008, which is hereby incorporated by reference for all purposes as if fully set forth herein.

BACKGROUND OF THE INVENTION

1. Field of the Invention

The present invention relates to a liquid crystal display module.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

Generally, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

The LCD device includes a backlight unit to supply light to a liquid crystal panel. The backlight unit is categorized into an edge type and a direct type. The edge type backlight unit includes a lamp at a side of a light guide plate. The direct type backlight unit includes a plurality of lamps below the liquid crystal panel.

FIG. 1 is a cross-sectional view of an LCD module including a direct type backlight unit according to the related art.

Referring to FIG. 1, the LCD module includes a liquid crystal panel 10, a direct type backlight unit 20, a main supporter 30, a top case 40 and a bottom case 50.

The liquid crystal panel 10 includes first and second substrates 12 and 14 and a liquid crystal layer between the first and second substrates 12 and 14.

The direct type backlight unit includes a reflector 22 on the bottom case 15, a plurality of lamps 24 in parallel to one another, and a plurality of optical sheets 26. The optical sheets include a diffusion sheet, a prism sheet and a protection sheet.

Cold cathode fluorescent lamp (CCFL), an external electrode fluorescent lamp (EEFL) or an light emitting diode (LED) may be used as the lamp 24. Among these lamps, the EEFL has many advantages, such as high luminance, high efficiency, long lifetime, and low weight. When the EEFL is used as the lamp 24, the lamp 24 includes a glass tube, and both external electrodes at both ends of the glass tube. A common electrode supplies driving voltages to the external electrodes.

FIG. 2 is a cross-sectional view illustrating a portion of the LCD module according to the related art.

Referring to FIG. 2, the lamp 24 as an EEFL includes a glass tube 24a and an external electrode 24b covering an end of the glass tube 24a. The external electrode 24b is supplied with a driving voltage from a common electrode 60.

The common electrode 60 includes first and second common lines 61a and 61b and a holder 63 connected to the first and second common lines 61a and 61b. Further, the common electrode 60 includes a stopper 65 facing the end of the EEFL 24. The stopper 65 is upright and prevents the lamp 24 from moving in a length direction of the lamp 24.

A portion of the LCD module opposite to the portion of FIG. 2 has a structure symmetric to the structure of FIG. 2. Accordingly, both external electrodes 24a of the lamp 24 are supported and fixed by the holders 63 and supplied with driving voltages.

The common electrode 60 is fixed to the bottom case 50 through a screw 70. The screw 70 includes a head portion 71 and a shaft portion 73. The head portion 71 has a line shaped or cross shaped groove at the top, and the screw 70 is fastened or unfastened by a screwdriver corresponding to the groove shape. The shaft portion 73 has a spiral thread at the side.

The screw 70 is driven downward into a screw hole 80 of the common electrode 60 and the bottom case 50 to couple the common electrode 60 with the bottom case 50. The screw hole 80 has a spiral groove engaging with the spiral thread of the screw 70.

In fastening the screw 70, sometimes, the shaft 73 is not straight inserted into the screw hole 80 and is inclined into the screw hole 80 due to various causes. In this situation, the spiral thread of the screw 70 and the spiral groove of the screw hole 70 is caused to be worn away and broken down since an excessive pressure is applied in a state of not engaging the thread with the groove. Accordingly, the screw 70 is loosely coupled with the screw hole 80, and the screw 70 is unfastened and comes off due to an external pressure.

Further, even though the screw 70 is straight fastened into the screw hole 80, the LCD module swings in moving the LCD module and so on, and this sometimes causes the screw 70 to be unfastened and come off.

Such the come-off screw 70 moves in the LCD module and may damage the lamp 24. To prevent this problem, resin is coated to the thread of the shaft portion 73 or a serration is added to the head portion 71. However, these methods increase production costs.

SUMMARY OF THE INVENTION

Accordingly, the present invention is directed to an LCD module that substantially obviates one or more of the problems due to limitations and disadvantages of the related art.

An advantage of the present invention is to provide an LCD module that can prevent a screw from coming off and reduce production costs.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display (LCD) module includes a bottom case; a reflector on the bottom case; a plurality of lamps on the reflector; a driving voltage supply portion supplying driving voltages to the lamps and coupled with the bottom case using a screw; a side supporter crossing and covering one end portions of the lamps and including a protrusion facing a head of the screw, wherein a distance between the protrusion and the screw is less than a height of the screw; a plurality of optical sheets on the side supporter;

a liquid crystal panel on the optical sheets; a main supporter surrounding the optical sheets and the liquid crystal panel; and a top case covering a peripheral region of the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to illustrated embodiments of the present invention, which are illustrated in the accompanying drawings.

Figure 1:
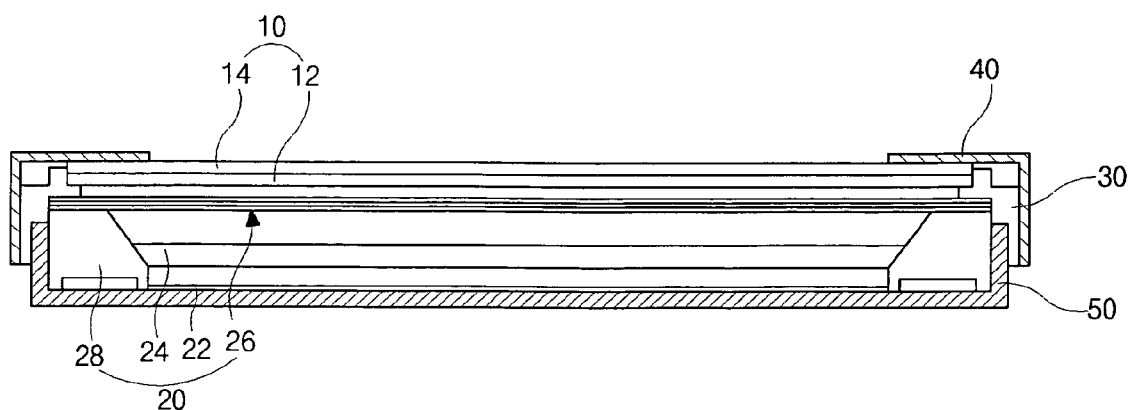
FIG. 1 is a cross-sectional view of an LCD module including a direct type backlight unit according to the related art.
Figure 2:
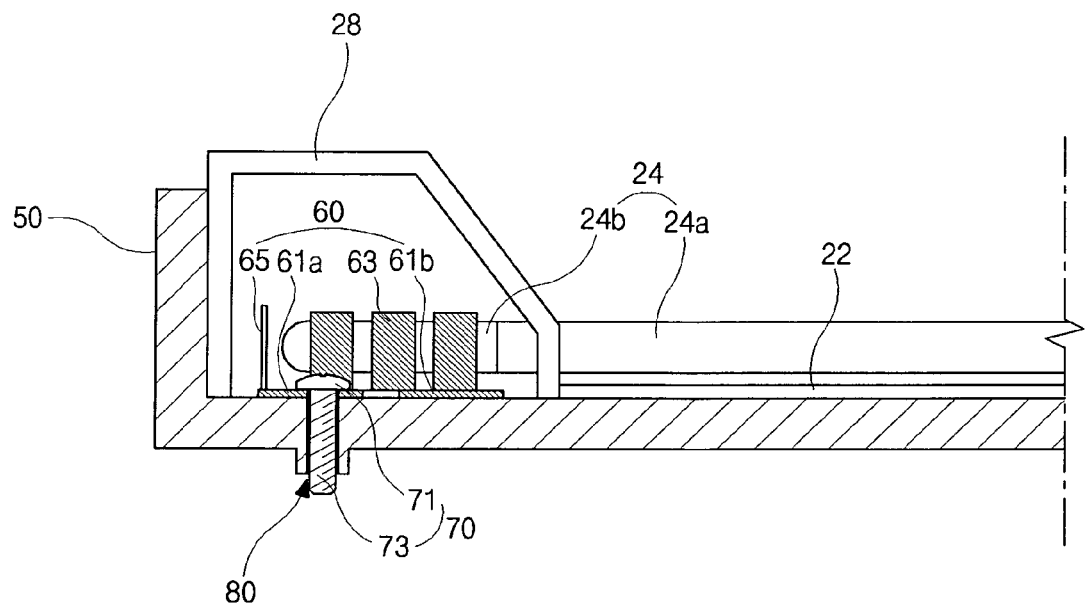
FIG. 2 is a cross-sectional view illustrating a portion of the LCD module according to the related art.
Figure 3:
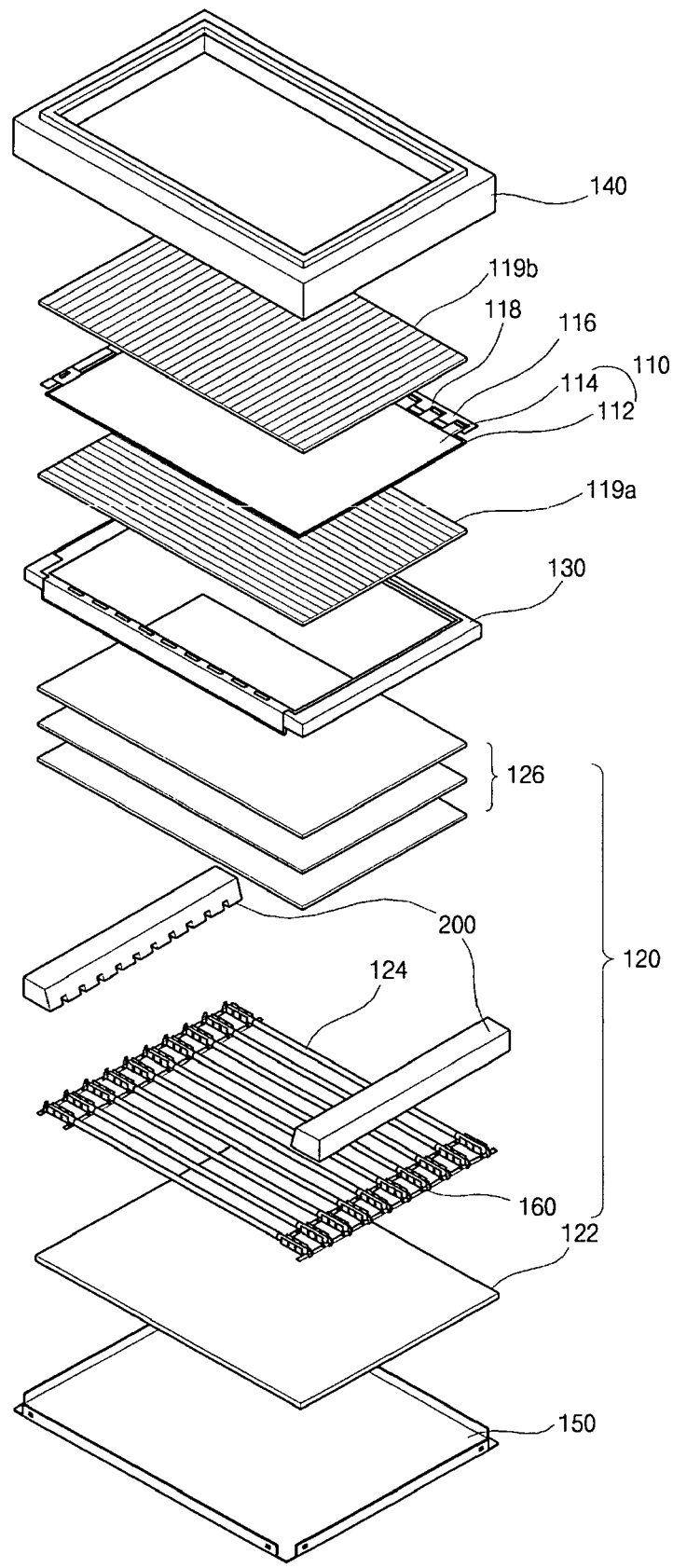
FIG. 3 is a perspective view illustrating an LCD module according to a first embodiment of the present invention.

FIG. 3 is a perspective view illustrating an LCD module according to a first embodiment of the present invention.

Referring to FIG. 3, the LCD module includes a liquid crystal panel 110, a direct type backlight unit 120, a main supporter 130, a top case 140 and a bottom case 150.

The liquid crystal panel 110 includes first and second substrates 112 and 114, and a liquid crystal layer between the first and second substrates 112 and 114.

Even though not shown in FIG. 3, the first substrate 112 may include gate and data lines to define pixel regions. In each pixel region, a thin film transistor is connected to the corresponding gate and data lines, and a pixel electrode is connected to the thin film transistor. The second substrate 114 may include a black matrix corresponding to the gate and data lines and the thin film transistor, a color filter layer in the pixel region, and a common electrode on the color filter layer. First and second alignment layers may be formed on inner surfaces of the first and second substrates 112 and 114. A seal pattern is formed in a peripheral region of the first and second substrates 112 and 114 and attaches the first and second substrates 112 and 114.

A driving PCB (printed circuit board) 116 may be connected to the liquid crystal panel 110 through a connection portion 118 such as a flexible circuit board. The flexible circuit board is bent so that the driving PCB 116 is placed on a side of the main supporter 130 or on a bottom of the bottom case 150.

First and second polarizers 119a and 119b may be attached to outer surfaces of the first and second substrates 112 and 114.

The backlight unit 120 includes a reflector 122 on the bottom case 150, a plurality of lamps 124 parallel to one another and on the reflector 122, and a plurality of optical sheets 126. The plurality of optical sheets 126 may include a diffusion sheet, a prism sheet and a protection sheet. The reflector reflects light back to the optical sheets 126. A light emitted from the lamps 124 passes through the optical sheets 126 and a uniform plane light is produced and supplied to the liquid crystal panel 110.

In the first embodiment, an EEFL may be used as the lamp 124. Both external electrodes of the lamps 124 are supplied with driving voltages from a driving voltage supply portion. In the first embodiment, the driving voltage supply portion may be a common electrode 160.

A pair of side supporters 200 support and fix the lamps 124 at both ends of the EEFLs 124. The side supporters 200 may be coupled with the bottom case 150. The optical sheets 126 are placed on the side supporters 200. Accordingly, the side supporters 200 function to maintain a distance between the optical sheets 126 and the lamps 124. Further, the side supporters 200 function to prevent a screw, which couples the common electrode 160 with the bottom case 150, from being unfastened and coming off.

The main supporter 130 has a frame shape, for example, a rectangular frame shape. The main supporter 130 surrounds the liquid crystal panel 110 and the backlight unit 120. The top case 140 covers a peripheral region of the liquid crystal panel 110. The bottom case 150 covers and supports the backlight unit 120 at the bottom of the LCD module.

Figure 4A:
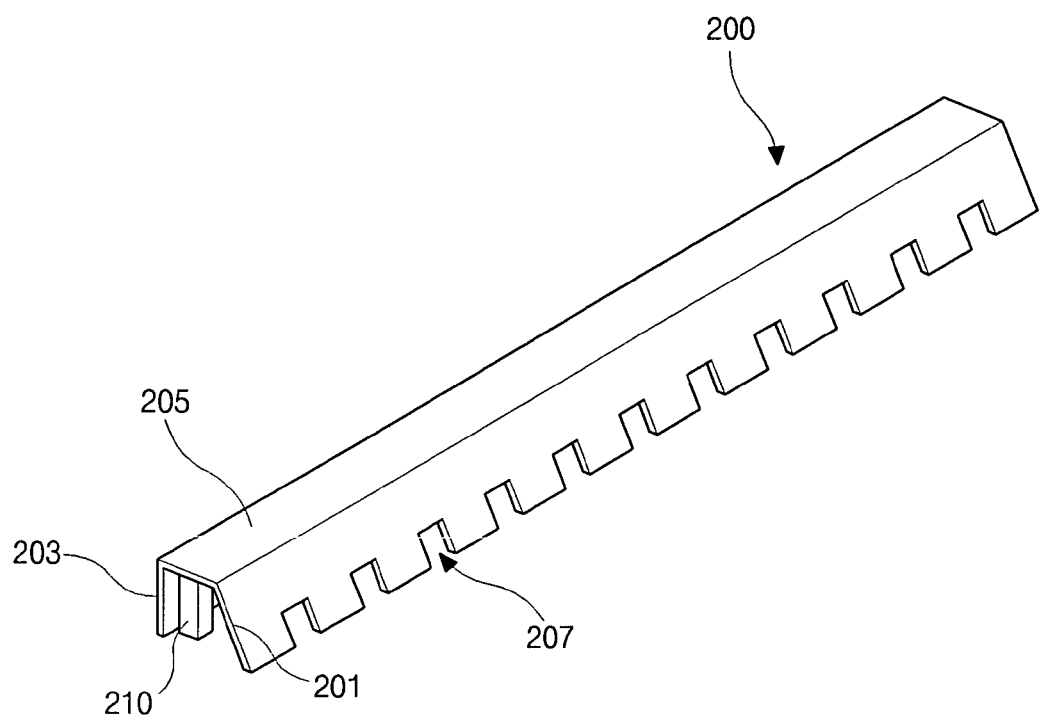
FIGS. 4A and 4B are perspective views illustrating at different angles the side supporter in the LCD module according to the first embodiment of the present invention.
Figure 4B:
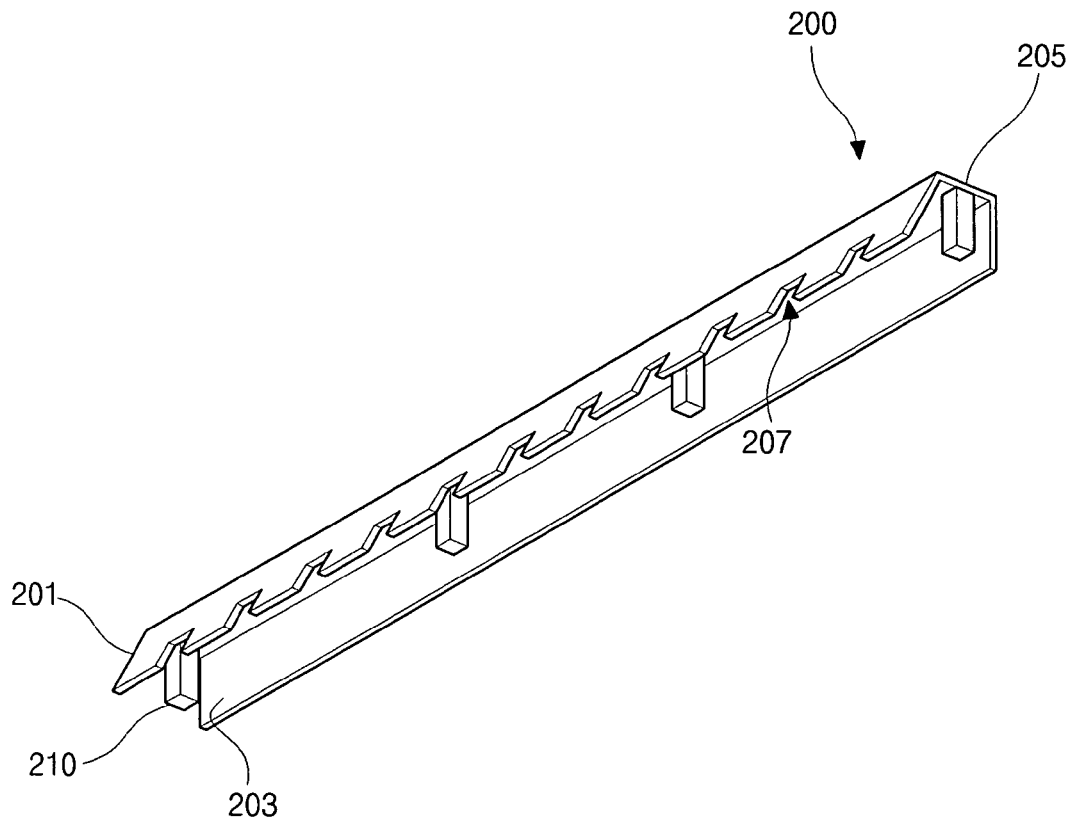

FIGS. 4A and 4B are perspective views illustrating at different angles the side supporter in the LCD module according to the first embodiment of the present invention. FIG. 4B shows a bottom of the side supporter 200.

Referring to FIGS. 4A and 4B, the side supporter 200 is one of the pair of side supporters 200 of FIG. 3. The other one of the pair of side supporters 200 has a structure symmetric to the structure of the side supporter 200 of FIGS. 4A and 4B.

The side supporter 200 extends in a direction, for example, an lamp arrangement direction of FIG. 3. The side supporter 200 includes a first side portion 201, a second side portion 203 and a top portion 205. The first side portion 201 is inclined and at an obtuse angle to the top portion 205. The second side portion 203 is substantially perpendicular to the top portion 205. The first and second side portions 201 and 203 face each other. Even though not shown in FIGS. 4A and 4B, the side supporter 200 includes both end portions of a length direction of the side supporter 200 as shown in FIG. 3.

The first side portion 201 includes a plurality of holes 207 in the length direction of the side supporter 200. The holes 207 correspond to the lamps (124 of FIG. 3), respectively, and the lamp passes through the corresponding hole 207.

The side supporter 200 further includes a plurality of protrusions 210 in an inner space of the side supporter 200, which is surrounded by the first and second side portions 201 and 203 and the top portion 205. The protrusions 210 are arranged in the length direction of the side supporter 200. The protrusion 210 of the first embodiment may be referred to as a boss. The protrusion 210 may protrude from the top portion 205 toward the bottom case (150 of FIG. 3). The protrusion 210 may have various column shapes, for example, circular column shape or polygonal column shape such as a quadrangular column shape.

The protrusion 210 may be in a single body with the first and second side portions 201 and 203 and the top portion 205. The protrusion 210 may have a height less than a height of the second side portion 203, with respect to the top portion 205. For example, in the LCD module, the second side portion 203 is placed on the bottom case while the protrusion 210 is spaced apart from the bottom case.

Figure 5:
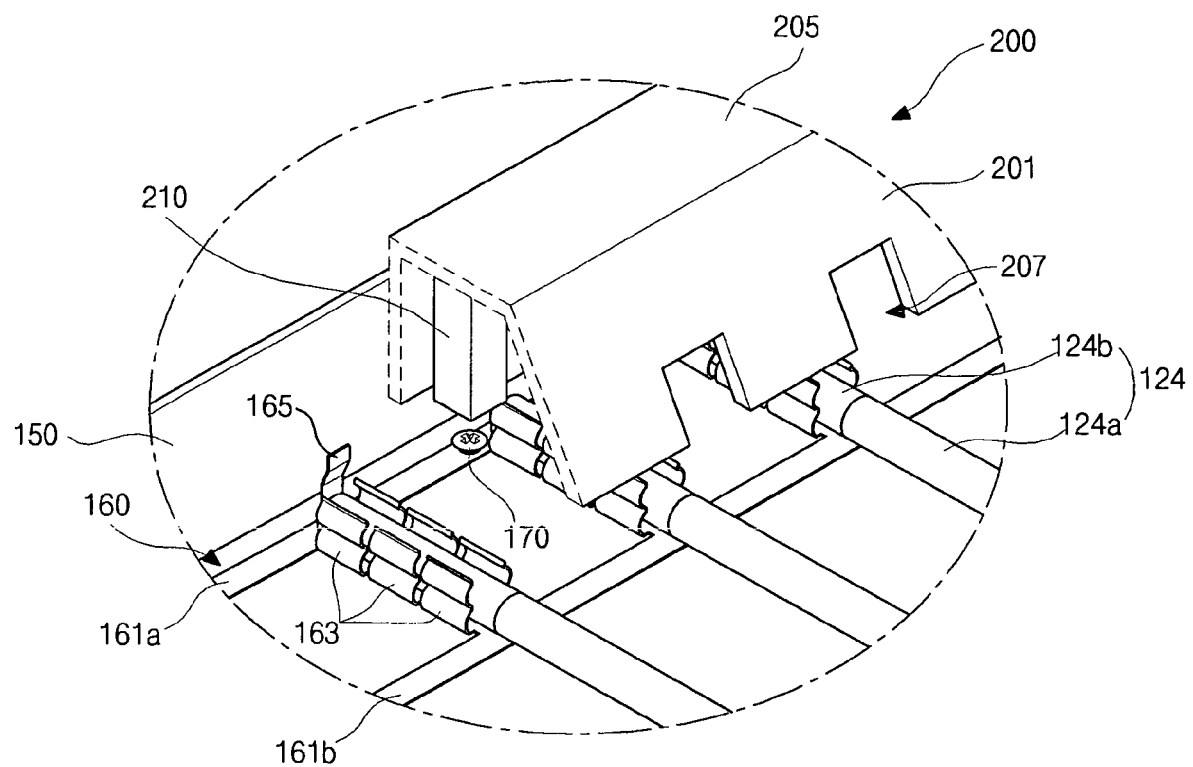
FIG. 5 is a perspective view illustrating a portion of the LCD module according to the first embodiment of the present invention.
Figure 6A:
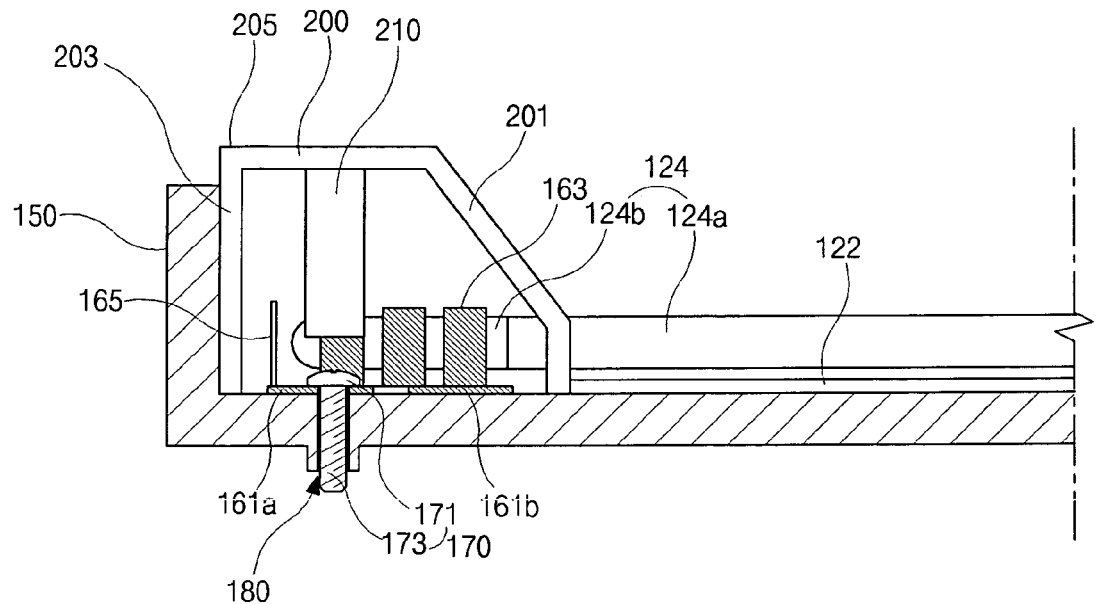
FIGS. 6A and 6B are cross-sectional views illustrating the prevention of a screw from coming off in the LCD module according to the first embodiment of the present invention.
Figure 6B:
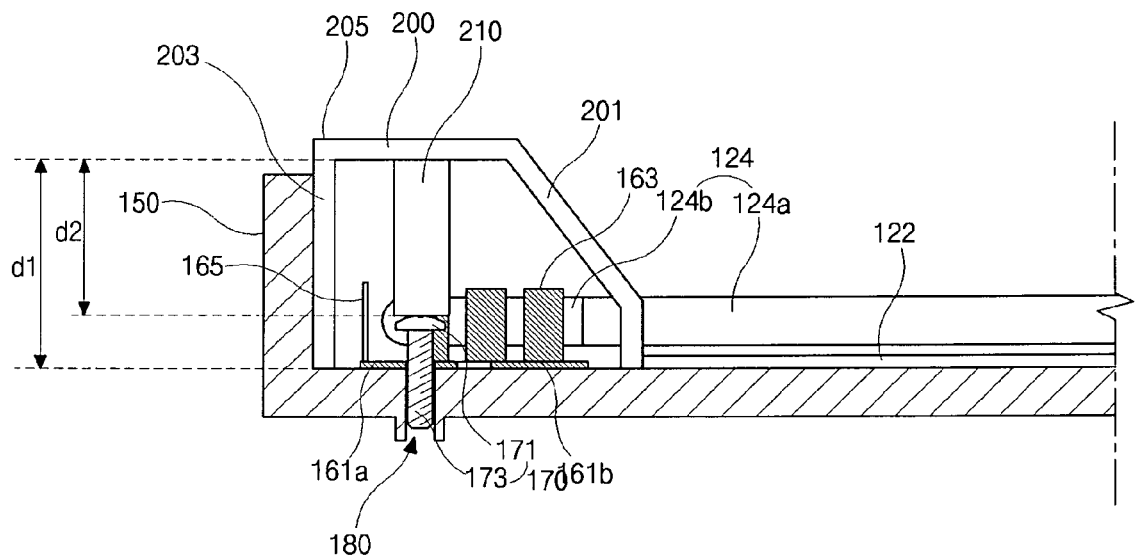

FIG. 5 is a perspective view illustrating a portion of the LCD module according to the first embodiment of the present invention, and FIGS. 6A and 6B are cross-sectional views illustrating the prevention of a screw from coming off in the LCD module according to the first embodiment of the present invention.

Referring to FIG. 5, an external electrode 124b of a lamp 124 covers the end of the glass tube 124a of the lamp 124. A common electrode 160 includes first and second common lines 161a and 161b in a length direction of a side supporter 200, and a holder 163 connected to the first and second common lines 161a and 161b. An end portion of the lamp 124 is fit into the corresponding holder 163. Accordingly, the holder 163 supports and fixes the external electrode 124b, and the external electrode 124b contacts the holder 163 and is supplied with a driving voltage. Further, the common electrode 160 includes a stopper 165 facing the end of the lamp 124. The stopper 165 is upright and prevents the lamp 124 from moving in a length direction of the lamp 124.

The common electrode 160 is coupled with the bottom case 150 through a screw 170. The common electrode 160 is covered and protected by the side supporter 200. The external electrode 124b is covered and protected by the side supporter 200. Since the side supporter 200 has the slanted second side portion 201, a width of a bezel, which covers the top case (140 of FIG. 3) and a peripheral region of the liquid crystal panel (110 of FIG. 3), can be reduced and a display region of the LCD device can increase.

A protrusion 210 corresponds in position to the screw 170. Accordingly, even though the screw 170 gets loose and goes upward, the protrusion 210 blocks the screw 170 from being totally unfastened and coming off.

Referring to FIG. 6A, the common electrode 160 is fixed to the bottom case 150 using the screw 170. The screw 170 includes a head portion 171 and a shaft portion 173. The head portion 171 has a line shaped or cross shaped groove at the top, and the screw 170 is fastened or unfastened by a screwdriver corresponding to the groove shape. The shaft portion 173 has a spiral thread at the side.

The screw 170 is driven downward into a screw hole 180 of the common electrode 160 and the bottom case 150 to couple the common electrode 160 with the bottom case 150. The screw hole 180 has a spiral groove engaging with the spiral thread of the screw 170. After the screw 170 is fastened, the bottom of the head portion 171 contacts a top of the common electrode 160, and the head portion 171 is exposed over the top of the common electrode 160.

The protrusion 210 is located over and faces the head potion 171. In fastening the screw 170, sometimes, the shaft 173 may not be straight inserted into the screw hole 180 and be inclined into the screw hole 180 due to various causes. In such the circumstances, the screw 170 is subject to be loosely coupled with the screw hole 180 and totally come off from the screw hole 180. However, referring to FIG. 6B, the screw 180 goes up a little and is blocked by the protrusion 210. Accordingly, the screw 180 does not get out of the screw hole 180 any more. Accordingly, the lamp 124 can be prevented from being damaged due to the come-off screw 180.

A height d2 of the protrusion 210 is less than a height d1 of the second side portion 203. The height d2 of the protrusion 210 is appropriately determined in consideration of a thickness of the common electrode 160 and a thickness of the head portion 171. Further, to block the screw 170 from coming off, the height d1 of the protrusion 210 is set such that a distance between the top portion 171 of the fastened screw 180 and the bottom of the protrusion 210 is less than a height of the screw 170.

Figure 7A:
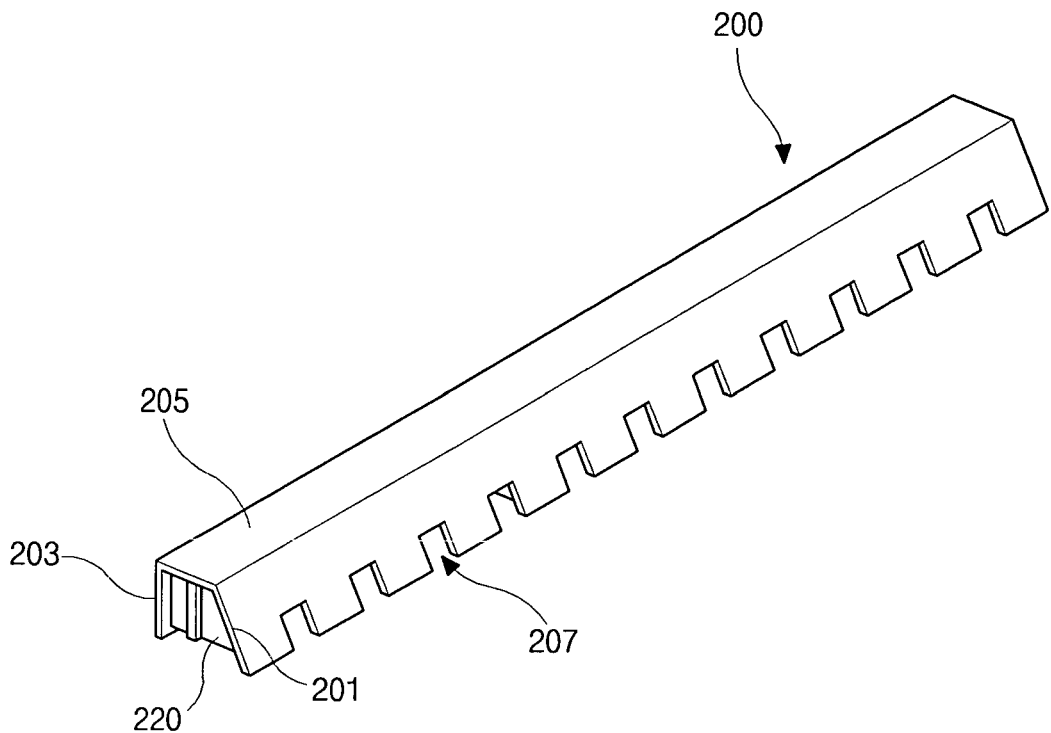
FIGS. 7A and 7B are perspective views illustrating, at different angles, a side supporter in an LCD module according to a second embodiment of the present invention.
Figure 7B:
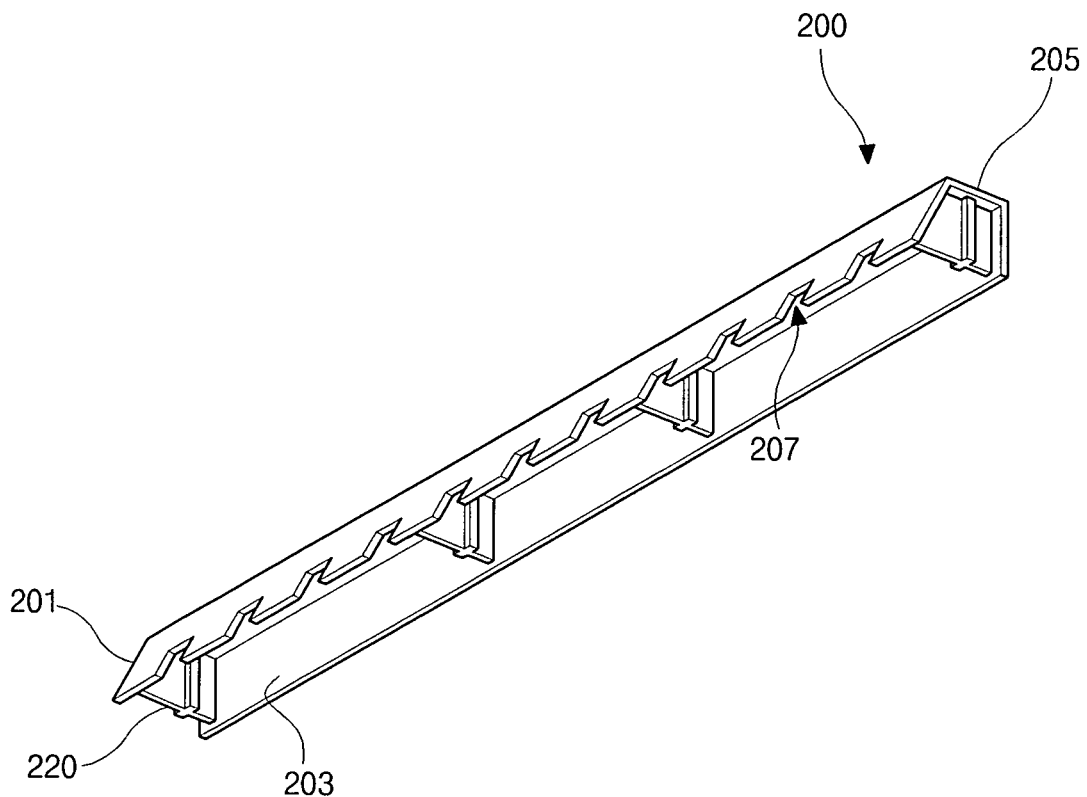

FIGS. 7A and 7B are perspective views illustrating at different angles a side supporter in an LCD module according to a second embodiment of the present invention. FIG. 7B shows a bottom of the side supporter 200.

The LCD module of the second embodiment is similar to the LCD module of the first embodiment except for the side supporter. Explanations of parts similar to parts of the first embodiment may be omitted.

Referring to FIGS. 7A and 7B, the side supporter 200 includes a first side portion 201, a second side portion 203, a top portion 205, and a plurality of protrusions 220.

The protrusion 220 of the second embodiment may be referred to as a rib. The protrusion 220 protrudes from the top portion 205 and the first and second side portions 201 and 203. The protrusion 220 may have a first part and a second part crossing each other. The first part is perpendicular to a length direction of the side supporter 200, and the second part is parallel to the length direction of the side supporter 200. Accordingly, the protrusion 220 may have a cross shape viewed at bottom. The crossing portion of the first and second part may correspond to a screw. The protrusion 220 may be in a single body with the first and second side portions 201 and 203 and the top portion 205. The protrusion 220 has a height less than a height of the second side portion 203 in consideration of a common electrode and a top portion of the screw.

Figure 8:
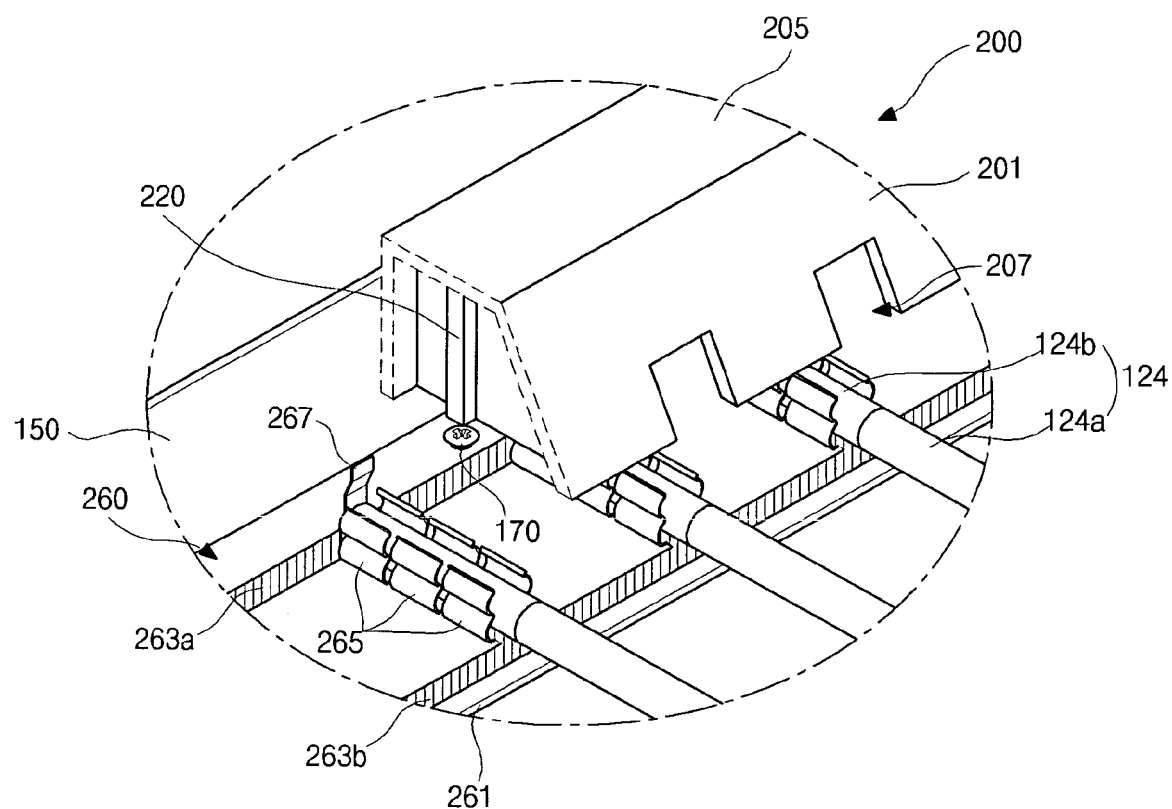
FIG. 8 is a view illustrating a portion of an LCD module according to a third embodiment of the present invention.

FIG. 8 is a view illustrating a portion of an LCD module according to a third embodiment of the present invention. The LCD module of the third embodiment is similar to the LCD modules of the first and second embodiments except for the driving voltage portion. Accordingly, explanations of parts similar to parts of the first and second embodiments may be omitted.

Referring to FIG. 8, the side supporter 200 similar to that of the second embodiment is used in the LCD module of the third embodiment. Alternatively, the side supporter of the first embodiment can be used in the LCD module of the third embodiment.

In the first and second embodiments, a plate type common electrode is used as the driving voltage supply portion. The metal plate type common electrode is formed by a press forming process. However, the press forming process may be complicated, and production costs may increase. Accordingly, in the third embodiment, a common electrode printed circuit board 260 may be used as the driving voltage supply portion.

The common electrode printed circuit board 260 includes an insulating substrate 261, a conductive thin film pattern including first and second common lines 263a and 263b on the insulating substrate 261, and a holder 265 on the insulating substrate 261 and connected to the first and second common lines 263a and 263b. An end portion of a lamp 124 is fit into the corresponding holder 265. Accordingly, the holder 265 supports and fixes the external electrode 124a, and the external electrode 124a contacts the holder 163 and is supplied with a driving voltage. Further, the common electrode printed circuit board 260 includes a stopper 267 facing the end of the lamp 124 and formed on the insulating substrate 261. The stopper 267 is upright and prevents the EEFL 124 from moving in a length direction of the EEFL 124.

The common electrode printed circuit board 260 is coupled with the bottom case 150 through a screw 170. A screw hole of the common electrode printed circuit board 260 may be formed at a place where the common lines 263*a* and 263*b* are not formed. The common electrode printed circuit board 260 may be covered and protected by the side supporter 200. A protrusion 220 corresponds in position to the screw 170 and blocks the screw 170 from being totally unfastened and coming off.

As described in the embodiments, the protrusion 220 is formed in the side supporter and corresponds to the screw. Accordingly, the lamp can be prevented from being damaged due to the come-off screw. Further, since the additional process such as coating resin and adding a serration in the related art is not needed, production costs can be reduced.

In the embodiments, the EEFL is an example of the lamp in the backlight unit. Alternatively, other types of lamp, for example, a CCFL can be employed in the backlight unit. When the CCFL is used, a driving voltage supplying portion such as a common electrode printed circuit board may be used in the backlight unit. The common electrode printed circuit board for the CCFL may include a lamp holder including a lamp connection portion and a socket mold, and the lamp connection portion may be connected to an electrode of the CCFL. Accordingly, the common electrode printed circuit board for the CCFL may be coupled with a bottom case through a screw, and a side supporter may have a protrusion corresponding to the screw and preventing the screw from being totally unfastened.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) module, comprising:
a bottom case;
a reflector on the bottom case;
a plurality of lamps on the reflector;
a driving voltage supply portion supplying driving voltages to the lamps and coupled with the bottom case using a screw;
a side supporter crossing and covering one end portions of the lamps and including a protrusion facing a head of the screw, wherein a distance between the protrusion and the screw is less than a height of the screw and wherein the protrusion blocks the screw from going up;
a plurality of optical sheets on the side supporter;
a liquid crystal panel on the optical sheets;
a main supporter surrounding the optical sheets and the liquid crystal panel; and
a top case covering a peripheral region of the liquid crystal panel.

2. The module according to claim 1, wherein the side supporter further includes a slanted first side portion, a second side portion facing the first side portion and perpendicular to the top portion, and a top portion connecting the first and second side portions, and wherein the first side portion includes a plurality of holes receiving the plurality of lamps, respectively.

3. The module according to claim 2, wherein the protrusion protrudes from the top portion toward to the screw and is in an inner surface surrounded by the top portion and the first and second portions.

4. The module according to claim 3, wherein the protrusion has a circular column shape or a polygonal column shape.

5. The module according to claim 3, wherein the protrusion includes a first part connected to the first and second portions, and a second part crossing the first part, and wherein a crossing portion of the first and second parts corresponds in position to the screw.

6. The module according to claim 3, wherein a height of the protrusion is less than a height of the second side portion.

7. The module according to claim 1, wherein the lamp includes a glass tube and an external electrode covering the glass tube at each of both end portions of the glass tube.

8. The module according to claim 1, wherein the driving voltage supply portion is made of a metal plate and includes a common line, and a holder connected to the common line and holding the end portion of the lamp.

9. The module according to claim 8, wherein the screw passes through the common line.

10. The module according to claim 8, wherein the common line includes first and second common lines, and the holder is between the first and second common lines.

11. The module according to claim 1, wherein the driving voltage supply portion includes an insulating substrate, a thin film common line on the insulating substrate, and a holder connected to the common line, on the insulating substrate and holding the end portion of the lamp.

12. The module according to claim 11, wherein the screw passes through the insulating substrate outside the common line and the holder.

* * * * *